United States Patent
Butala et al.

(10) Patent No.: US 7,730,381 B2
(45) Date of Patent: *Jun. 1, 2010

(54) ERASURE DETECTION AND POWER CONTROL FOR A TRANSPORT CHANNEL WITH UNKNOWN FORMAT IN A WIRELESS COMMUNICATION SYSTEM

(75) Inventors: Amit Butala, Santa Clara, CA (US); Parvathanathan Subrahmanya, Sunnyvale, CA (US); Hyukjun Oh, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1313 days.

This patent is subject to a terminal disclaimer.

(21) Appl. No.: 10/875,107

(22) Filed: Jun. 9, 2004

(65) Prior Publication Data

US 2005/0276248 A1 Dec. 15, 2005

(51) Int. Cl.
*H03M 13/00* (2006.01)
(52) U.S. Cl. .................... 714/760; 714/774
(58) Field of Classification Search ........... 714/774, 714/779, 760
See application file for complete search history.

(56) References Cited

U.S. PATENT DOCUMENTS

| | | | | |
|---|---|---|---|---|
| 5,751,725 | A * | 5/1998 | Chen | 714/708 |
| 6,029,268 | A | 2/2000 | Kong et al. | |
| 6,208,699 | B1 * | 3/2001 | Chen et al. | 375/340 |
| 6,560,744 | B1 * | 5/2003 | Burshtein | 714/774 |
| 6,633,552 | B1 * | 10/2003 | Ling et al. | 370/318 |
| 7,159,164 | B1 * | 1/2007 | Saifuddin et al. | 714/755 |
| 7,181,170 | B2 * | 2/2007 | Love et al. | 455/67.13 |
| 7,197,692 | B2 * | 3/2007 | Sutivong et al. | 714/796 |
| 2003/0014728 | A1 | 1/2003 | Shaeffer et al. | |
| 2004/0095918 | A1 * | 5/2004 | Dominique et al. | 370/342 |
| 2005/0123059 | A1 * | 6/2005 | Harris et al. | 375/244 |
| 2005/0138671 | A1 * | 6/2005 | Love et al. | 725/123 |

FOREIGN PATENT DOCUMENTS

| | | |
|---|---|---|
| WO | 03065613 | 7/2003 |
| WO | 2004006599 | 1/2004 |
| WO | 2004054311 | 6/2004 |

OTHER PUBLICATIONS

International Search Report, PCT/US2005/019785, International Searching Authority, European Patent Office, Nov. 24, 2005.
Written Opinion, PCT/US2005/019785, International Searching Authority, European Patent Office, Nov. 24, 2005.

* cited by examiner

*Primary Examiner*—M. Mujtaba K Chaudry
(74) *Attorney, Agent, or Firm*—Kevin Cheatham; Eric Ho (57) ABSTRACT

Erasure detection and power control are performed for an intermittently active transport channel with unknown format. A receiver processes each received block and determines whether it passes or fails CRC. For each received block with CRC failure, the receiver performs erasure detection by computing a symbol error rate (SER) and energy of the received block, comparing the computed SER against an SER threshold, comparing the computed energy against an energy threshold, and declaring an erasure if the computed SER is less than the SER threshold and the computed energy exceeds the energy threshold. The SER and energy thresholds may be adjusted based on the average SER and the average energy for prior received blocks with CRC failures. For power control, an SIR target is increased by an UP step whenever an erased block is detected for the transport channel.

30 Claims, 8 Drawing Sheets

ERASURE DETECTION AND POWER CONTROL FOR A TRANSPORT CHANNEL WITH UNKNOWN FORMAT IN A WIRELESS COMMUNICATION SYSTEM

BACKGROUND

I. Field

The present invention relates generally to communication, and more specifically to techniques for performing erasure detection and power control in a wireless communication system.

II. Background

In a wireless communication system, a wireless device (e.g., a cellular phone) communicates with one or more base stations via transmissions on the downlink and uplink. The downlink (or forward link) refers to the communication link from the base station to the wireless device, and the uplink (or reverse link) refers to the communication link from the device to the base station. In a Code Division Multiple Access (CDMA) system, a base station can transmit data to multiple wireless devices simultaneously. The total transmit power available at the base station thus determines the downlink capacity of the base station. A portion of the total available transmit power is allocated to each active wireless device such that the aggregate transmit power used for all active devices is less than or equal to the total available transmit power.

To maximize downlink capacity, a power control mechanism is typically used for each wireless device. The power control mechanism is normally implemented with two power control loops, which are often called an "inner" loop and an "outer" loop. The inner loop adjusts the transmit power used for the wireless device such that the received signal quality (which may be quantified by a signal-to-noise-plus-interference ratio (SIR)) for a downlink transmission, as measured at the device, is maintained at an SIR target. The outer loop adjusts the SIR target to achieve the desired level of performance, which may be quantified by a block error rate (BLER) target or some other performance criterion.

The outer loop typically adjusts the SIR target based on the status of received data blocks. In a common implementation, the outer loop decreases the SIR target by a small DOWN step if a "good" data block is received and increases the SIR target by a large UP step if a "bad" data block is received. The DOWN and UP steps are selected based on the BLER target and possibly other considerations. This outer loop implementation assumes that the status of each received data block can be reliably determined. This can normally be achieved by applying an error detection code, such as a cyclic redundancy check (CRC) code, on each data block prior to transmission. Each data block would then include a CRC value that can be checked by the wireless device to determine whether the block was decoded correctly (good) or in error (bad or erased).

A CDMA system may support data transmission using multiple transport channels and with multiple formats. One transport channel may carry data blocks continually and may use formats that require a CRC value to be included in each data block sent on that transport channel. Another transport channel may be operated in a non-continuous manner so that data blocks are not transmitted some or most of the time on the transport channel. This non-continuous transmission is often called discontinuous transmission (DTX). No data blocks are transmitted on the transport channel during periods of no transmission, and the non-transmitted blocks are often called DTX blocks. Power control for a data transmission using an intermittently active transport channel is challenging. This is because it may be difficult to accurately ascertain the true status of each received block on such a transport channel, i.e., whether the received block is a good block, a DTX block, or a bad block.

There is therefore a need in the art for techniques to reliably determine the status of each received block and to perform power control for a data transmission sent using an intermittently active transport channel.

SUMMARY

Techniques for performing erasure detection and power control for an intermittently active transport channel with unknown format are described herein. Because the transport channel is intermittently active, a data block may or may not be sent on the transport channel in each transmission time interval (TTI). Because the format for the transport channel is unknown, a receiver does not know whether a received block is for a transmitted block or a non-transmitted block.

For such a transport channel, the receiver can process and determine whether each received block is a good block, an erased block, or a DTX block. The received block is deemed to be a good block if it passes a CRC. For each received block that fails the CRC, the receiver can perform erasure detection to determine whether the block is an erased block or a DTX block. In a specific embodiment for performing erasure detection, the receiver determines a symbol error rate (SER) and the energy of a received block with CRC failure, compares the SER for the received block against an SER threshold, compares the energy of the received block against an energy threshold, and declares the received block to be an erased block if the SER for the received block is less than the SER threshold and the energy of the received block is greater than the energy threshold. The receiver may dynamically adjust the SER threshold based on an average SER for prior received blocks with CRC failures and may similarly adjust the energy threshold based on an average energy for the prior received blocks with CRC failures. Other and/or different metrics may also be used for erasure detection.

Power control of an intermittently active transport channel with unknown format may be performed, for example, in conjunction with a second transport channel that is either continuously active or has a known format. The SIR target for both transport channels may be adjusted up or down in the normal manner based on blocks received on the second transport channel. However, if an erased block is detected for the intermittently active transport channel, then the SIR target may be increased, for example, by a larger than normal UP step.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
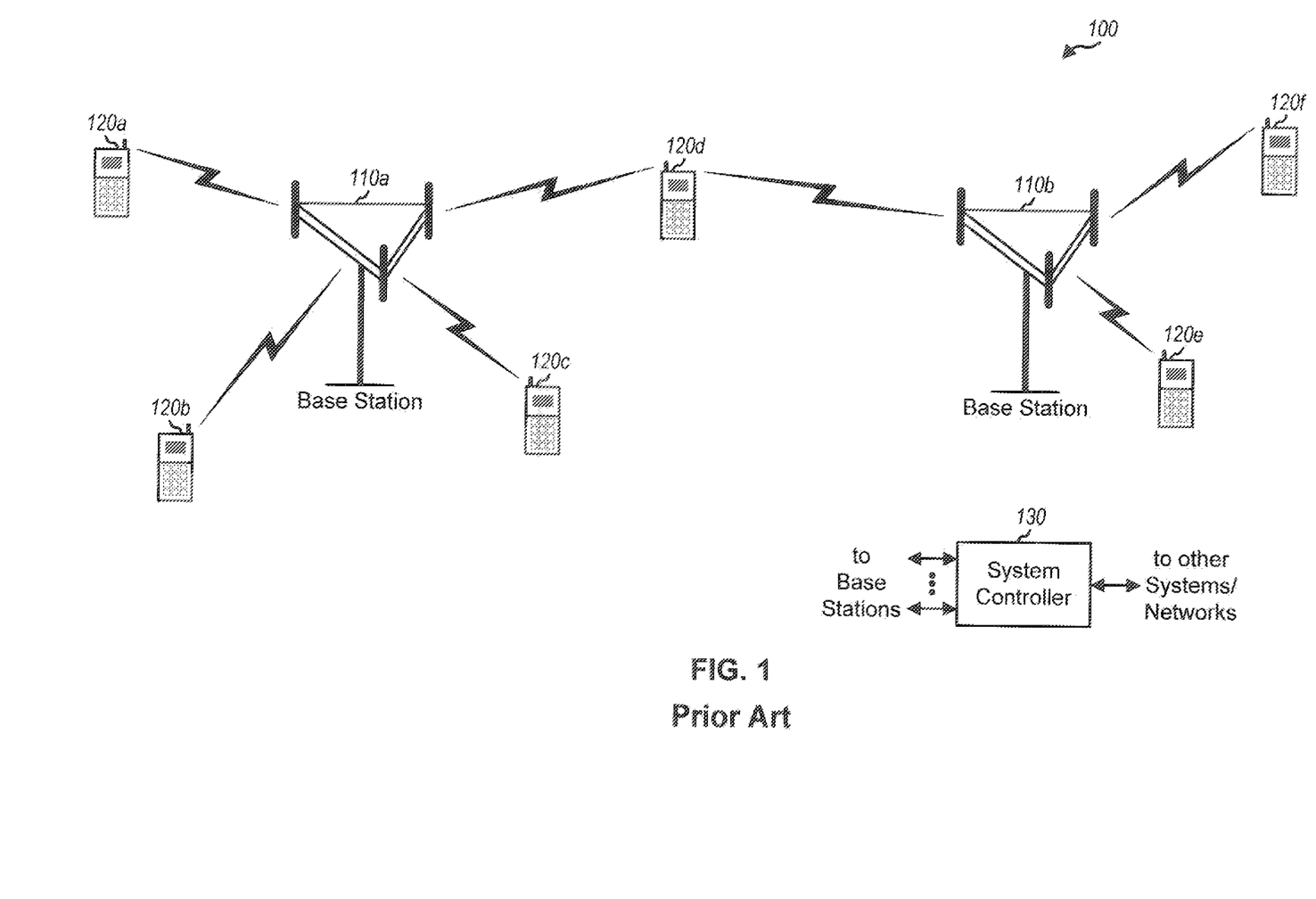
FIG. 1 shows a wireless communication system.

FIG. 1 shows a wireless communication system 100. Each base station 110 in system 100 provides communication coverage for a respective geographic area. A base station is a fixed station and may also be referred to as a Node B, a base transceiver subsystem (BTS), an access point, or some other terminology. Wireless devices 120 are typically dispersed throughout system 100. A wireless device may be fixed or mobile and may also be referred to as a user equipment (UE), a mobile station, a terminal, or some other terminology. A wireless device may communicate with one or multiple base stations on the downlink and/or one or multiple base stations on the uplink at any given moment. A system controller 130 couples to base stations 110 and may further couple to other systems and networks, e.g., a public switched telephone network (PSTN), a network entity that supports packet data, and so on. System controller 130 provides coordination and control for the base stations coupled to it and further controls the routing of data for the wireless devices served by these base stations. System controller 130 may also be called a radio network controller (RNC), a base station controller (BSC), or some other terminology.

System 100 may be a CDMA system that may implement one or more CDMA standards such as Wideband-CDMA (W-CDMA), IS-2000, IS-856, IS-95, and so on. System 100 may also be a Time Division Multiple Access (TDMA) system that may implement one or more TDMA standards such as Global System for Mobile Communications (GSM). These standards are well known in the art. System 100 may also be a Frequency Division Multiple Access (FDMA) system.

The erasure detection and power control techniques described herein may be used for various wireless communication systems that employ closed-loop power control. These techniques may also be used for the downlink as well as the uplink. For clarity, these techniques are specifically described below for downlink power control of a voice call in a system that implements W-CDMA.

In W-CDMA, a base station transmits data and signaling to a wireless device using one or more logical channels at a Radio Link Control (RLC) layer. The logical channels commonly used for data transmission include a dedicated traffic channel (DTCH) and a dedicated control channel (DCCH). The logical channels are mapped to transport channels at a Medium Access Control (MAC) layer. The transport channels may carry data for one or more services (e.g., voice, video, packet data, and so on), and each transport channel may be coded separately. The transport channels are further mapped to physical channels at a physical layer. The channel structure for W-CDMA is described in a document 3GPP TS 25.211, which is publicly available.

A transport channel in W-CDMA may be viewed as a data/message bearer. Each transport channel is associated with a transport format set that includes one or more transport formats that may be used for that transport channel. The transport format set for each transport channel may be selected/configured during call setup. Each transport format specifies various processing parameters such as (1) a transmission time interval (TTI) over which the transport format applies, (2) the size of each block of data (or transport block), (3) the number of transport blocks for each TTI, (4) the length of each code block, (5) the coding scheme to use for the TTI, and so on. Only one TTI is used for each transport channel, and this TTI may span one, two, four, or eight frames. A frame is a time duration of 10 msec in W-CDMA. A BLER target may also be specified for each transport channel, which allows different transport channels to achieve different quality of service (QoS). Each transport channel may require a different SIR target, which is dependent on the BLER target and the transport format(s) used for that transport channel.

Different sets of transport channels may be used for different types of calls (e.g., voice, packet data, and so on) and for different calls of the same type. A voice call in W-CDMA is processed using an Adaptive Multi Rate (AMR) speech coding scheme, which encodes speech data into three classes of data bits—Classes A, B, and C. Class A includes the most important data bits, Class B includes the next most important data bits, and Class C includes the least important data bits. Because of the difference in importance, the data bits for each class are transmitted on a different transport channel.

Figure 2:
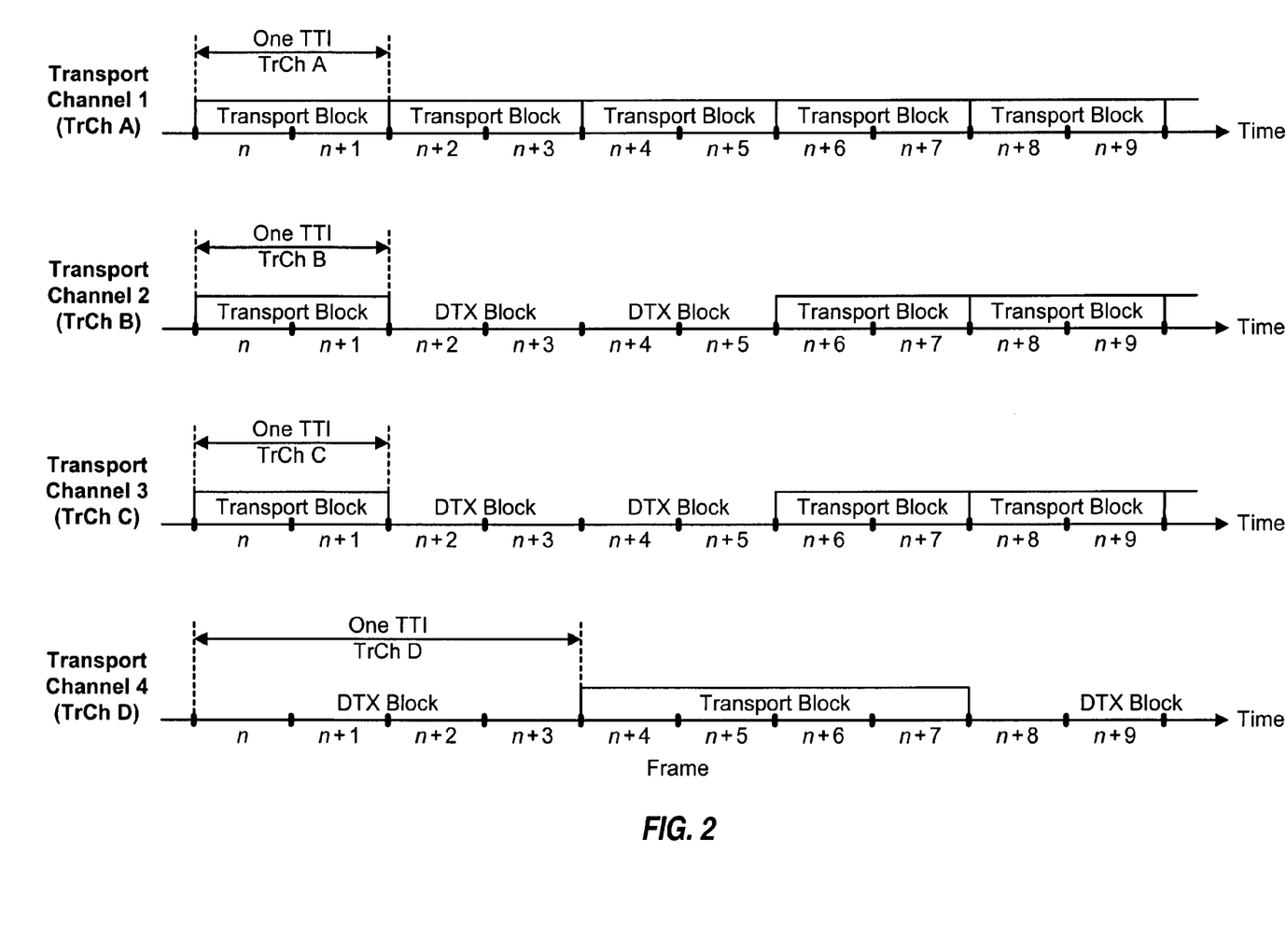
FIG. 2 shows the transport channels used for a voice call in W-CDMA.

FIG. 2 shows the transport channels used for an example voice call in W-CDMA, as described in 3GPP TS 34.108, Section 6.10.2.4. Transport channels 1 through 4 are four instances of a dedicated transport channel (DCH). Transport channels 1 through 3 carry speech data for the voice call, which is processed as three subflows for a DTCH at the RLC layer. Transport channel 4 carries control data for the voice call, which is processed as a DCCH at the RLC layer.

Transport channel 1 carries Class A data bits, which are coded with a rate ⅓ convolutional code and a CRC code. Transport channel 2 carries Class B data bits, which are coded with a rate ⅓ convolutional code but no CRC code. Transport channel 3 carries Class C data bits, which are coded with a rate ½ convolutional code but no CRC code. Transport channel 4 carries control data for the DCCH, which is coded using a rate ⅓ convolutional code and a CRC code. Transport channels 1, 2, 3, and 4 are also called TrCh A, B, C, and D, respectively.

As indicated in 3GPP TS 34.108, three transport formats may be used for transport channel 1, and two transport formats may be used for each of transport channels 2 through 4. The three transport formats for transport channel 1 are commonly labeled as 1x81, 1x39 and 1x0, where transport format 1x81 is associated with voice activity and transport formats 1x39 and 1x0 are associated with no voice activity. All three transport formats for transport channel 1 use a CRC. Thus, for each TTI, a transport block with a CRC value and for one of the three transport formats is sent on transport channel 1 regardless of whether or not there is voice activity in the TTI. One of the transport formats for each of transport channels 2 through 4 is for a DTX block. Thus, a transport block may or may not be transmitted in any given TTI for each of transport channels 2 through 4. As specified in 34.108, for AMR (voice calls), TrCh B and C are either both present or both not-present in each TTI. Transport channels 1, 2, and 3 have TTIs of two frames (20 msec), and transport channel 4 has a TTI of four frames (40 msec).

In W-CDMA, a downlink dedicated physical channel (downlink DPCH) is typically assigned to each wireless device for the duration of a call. The downlink DPCH is characterized by the possibility of fast data rate change (e.g., every 10 msec frame), fast power control, and inherent addressing to a specific wireless device.

Figure 3:
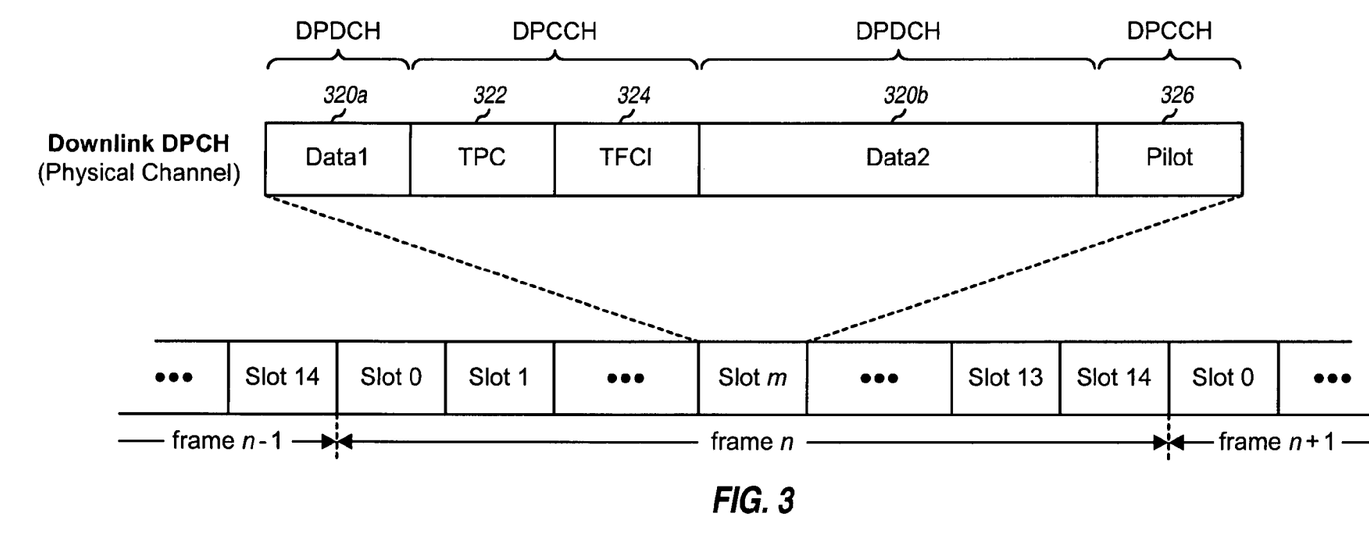
FIG. 3 shows the format for a downlink DPCH in W-CDMA.

FIG. 3 shows the format for the downlink DPCH in W-CDMA. The downlink DPCH is composed of a downlink dedicated physical data channel (DPDCH) and a downlink dedicated physical control channel (DPCCH), which are time division multiplexed. The DPDCH carries transport channel data (which is data for the transport blocks being sent on the transport channels carried by the downlink DPCH), and the DPCCH carries control data (or signaling information) for the physical layer. Data is transmitted on the downlink DPCH in radio frames. Each radio frame is sent over a 10 msec frame, which is divided into 15 slots. Each slot is partitioned into data fields 320a and 320b (Data1 and Data2), a transmit power control (TPC) field 322, a transport format combination indicator (TFCI) field 324, and a pilot field 326. Data fields 320a and 320b carry the transport channel data. TPC field 322 carries a TPC command for uplink power control. This TPC command directs the wireless device to adjust its uplink transmit power either up or down to achieve the desired uplink performance. TFCI field 324 carries transport format information for the downlink DPCH. Pilot field 326 carries a dedicated pilot for the wireless device. The duration of each field is determined by the slot format used for the downlink DPCH.

The transport channel data for all active transport channels is multiplexed onto the DPDCH. If the TTI for a given transport channel is longer than one frame, then each transport block for that transport channel is segmented onto multiple subblocks, with each subblock being sent in one frame. For each frame, the subblocks to be sent in that frame for all active transport channels are serially multiplexed into a coded composite transport channel (CCTrCH). The CCTrCH is further processed and transmitted on the DPDCH in one frame.

The TFCI field carries information for the transport formats used for the transport channels carried by the downlink DPCH in the current frame. The transport format information for each transport channel remains constant over the TTI used for the transport channel. The transport format information is used by the wireless device to process (e.g., decode) the transport blocks sent on the transport channels. The base station may elect to omit (not send) the transport format information. If this is the case, then the wireless device performs blind transport format detection (BTFD) to recover the transmitted transport blocks. For BTFD, the wireless device processes the received block for each transport channel in accordance with each of the possible transport formats for that transport channel and provides a decoded block for the transport format deemed most likely to have been used for that transport channel. The wireless device uses the CRC value (if any) included in the transport block to aid with the BTFD. BTFD is used for a voice call in W-CDMA and may also be used for other types of call.

1. Erasure Detection

For a voice call, control data for the DCCH is sent on a DCH (TrCh D in FIG. 2) using one of two transport formats: 1x148 and 0x148. The 1x148 format is for a transmission of a transport block that includes a CRC value. The 0x148 format is for a transmission of a DTX block that does not include a CRC value.

The wireless device performs BTFD for each transport channel for which the transport format information is not known. Since the transport formats for the downlink transport channels for a voice call are not known to the wireless device, it performs BTFD on the transport channel for the DCCH (TrCh D) at all times to ensure that all transport blocks sent on this transport channel can be recovered. The wireless device thus attempts to decode each received block on TrCh D. Since each transport block sent on TrCh D includes a CRC value, the wireless device also performs a CRC check on each decoded block and provides one of two possible outcomes for the block:

CRC success—indicates that the decoded block passes the CRC check, and

CRC failure—indicates that the decoded block fails the CRC check.

A CRC success occurs if a transport block was sent using the 1x148 format and was successful decoded by the wireless device. A CRC failure may result from either (1) a transport block being sent with the 1x148 format but decoded in error by the wireless device or (2) a DTX block being sent with the 0x148 format (which does not include a CRC value). Since the wireless device does not know whether the received block was sent using the 1x148 format or the 0x148 format, there is ambiguity as to whether the CRC failure was due to case (1) or (2) above.

When a CRC failure is encountered for a received block, it may be necessary to reliably determine whether the received block is for (1) a transport block that was transmitted but decoded in error (i.e., an erased block) or (2) a non-transmitted block (i.e., a DTX block). One application where this information is useful is for power control, as described below. Table 1 lists the possible status for a received block when the transport format is not known.

TABLE 1

| Block Status | Description |
| --- | --- |
| Good | The received block passes the CRC check. |
| DTX | The received block fails the CRC check and is deemed to be for a non-transmitted block. |
| Erasure | The received block fails the CRC check and is deemed to be for a transport block transmitted but decoded in error. |

The wireless device can perform erasure detection to determine whether a received block with CRC failure is an erasure or a DTX. The erasure detection may be performed based on one or more metrics such as SER, block energy, and so on.

The SER is the ratio of the number of symbol errors in a received block over the total number of symbols in the block. At the base station, the data bits in a transport block are encoded to obtain symbols, which are further processed and transmitted. At the wireless device, the received symbols for the received block are decoded to obtain decoded bits, which may be re-encoded in the same manner as performed by the base station to obtain re-encoded symbols. The received symbols may be sliced to obtain hard-decision symbols, each being either a '0' or a '1'. The hard-decision symbols may be compared against the re-encoded symbols to determine the symbol errors and the SER for the received block. If all transport blocks contain the same number of symbols, then the symbol errors may be used directly instead of having to be normalized by the total number of symbols in the block. In this case, the number of symbol errors and the SER may be used interchangeably. For example, TrCh D carries 148 data bits plus other overhead bits for each transport block, which are encoded with a rate ⅓ convolutional code to obtain 516 symbols, which are further punctured or repeated based on a particular rate matching attribute to obtain a specified number of coded symbols for that transport block.

The energy of a received block may be computed in various manners. In one embodiment, the block energy is computed by (1) determining the energy of each received symbol in the block as the sum of the squares of the inphase and quadrature components for the received symbol and (2) accumulating the energies of all received symbols in the block. In another embodiment, the block energy is computed by (1) determining the energy of each received symbol in the block, (2) accumulating the energies of all "good" received symbols having the same polarity as the corresponding re-encoded symbols, (3) accumulating the energies of all "bad" received symbols having opposite polarity as the corresponding re-encoded symbols (which are symbol errors), and (4) subtracting the bad received symbol energy from the good received symbol energy to obtain the block energy. In yet another embodiment, the block energy is computed by (1) multiplying each received symbol in the block with the corresponding re-encoded symbol to obtain a "correlated" energy for the received symbol and (2) accumulating the correlated energies for all received symbols in the block to obtain the block energy. The block energy may also be computed in other manners. In general, the block energy is an estimate of the actual received energy for the block. The block energy may also be called an energy metric or by some other terminology.

Figure 4:
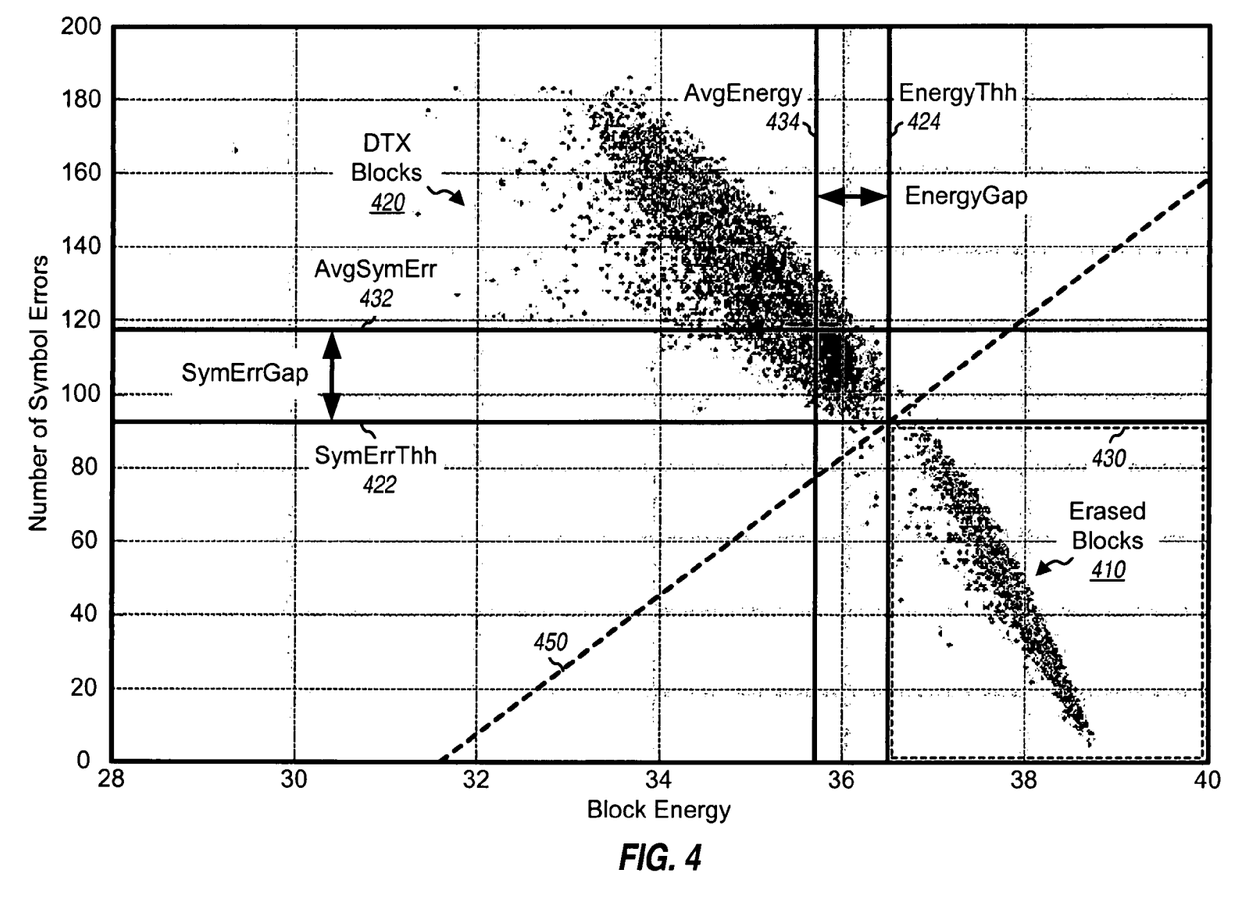
FIG. 4 shows distributions of erased blocks and DTX blocks.

FIG. 4 shows distributions of erased blocks and DTX blocks, plotted by the number of symbol errors versus block energy, for a specific operating scenario. The horizontal axis represents block energy, and the vertical axis represents the number of symbol errors (which is equivalent to SER since all blocks contain the same number of symbols). The number of symbol errors and block energy are determined for a large collection of erased blocks (sent using the 1x148 format) and DTX blocks (sent using the 0x148 format) on the TrCh D for a typical voice call. Each erased block and each DTX block is plotted in FIG. 4 at a coordinate determined by its number of symbol errors and block energy.

As shown in FIG. 4, the distribution of erased blocks, when plotted using the number of symbol errors and block energy, forms a cluster 410. Similarly, the distribution of DTX blocks forms another cluster 420. The energy of a DTX block tends to be lower than the energy of an erased block. This is intuitive since transmit power was used to send a transport block for the erased block whereas no transmit power was used for the DTX block. The number of symbol errors for a DTX block tends to be higher than the number of symbol errors for an erased block. This is also intuitive since transmit power was used for the erased block, and more symbols are likely to be received correctly.

FIG. 4 shows cluster 410 for the erased blocks overlapping a little with cluster 420 for the DTX blocks. An SER threshold (which is represented by a line 422) may be used to decide whether a given received block is an erased block or a DTX block based on the SER for the block. Similarly, an energy threshold (which is represented by a line 424) may be used to decide whether a given received block is an erased block or a DTX block based on the energy of the block. A combination of metrics may also be used to determine whether a given received block is an erased block or a DTX block.

FIG. 4 shows a distribution of erased blocks and DTX blocks for a specific operating scenario. Different operating scenarios may be associated with different distributions of erased blocks and DTX blocks.

In general, any number of metrics may be used for erasure detection and computed for each received block. Each computed metric may be compared against a threshold used for the metric. Each threshold may be either (1) a fixed threshold that does not change or (2) a dynamic/adaptive threshold that can change, e.g., based on the operating scenario. The thresholds may also be set to achieve the desired goals for erasure detection, as described below. A received block is declared as an erased block or a DTX block based on the results of the comparison for that block.

In an embodiment, the erasure detection is based on the SER and the block energy. An implementation of this embodiment using adaptive thresholds for SER and block energy may be expressed in pseudo-code, as follows:

```
if (Transport Format = Unknown) {
    if (CRC failure) {
        if ((NumSymErr < SymErrThh) AND (BlockEnergy > EnergyThh))
            Declare (Erasure);
        else
            Declare (DTX);
        Update (SymErrThh);
        Update (EnergyThh);
    }
}
``` where NumSymErr is the number of symbol errors for a received block that is known to have a CRC failure;

BlockEnergy is the energy of the received block with CRC failure;

SymErrThh is the threshold used for the number of symbol errors; and

EnergyThh is the threshold used for the block energy.

For the implementation described above, the received block is declared as an erasure if both of the following conditions are satisfied: (1) the number of symbol errors for the block is less than SymErrThh and (2) the energy of the received block is greater than EnergyThh. In FIG. 4, these two conditions correspond to the received block being declared an erasure if it maps to a point within a dashed box 430. The received block is declared as a DTX block if any one of the two conditions is not satisfied, which corresponds to the received block being mapped to a point outside of box 430.

The thresholds for SER and block energy may be defined, for example, as follows:

$$\text{SymErrThh} = \text{AvgSymErr} - \text{SymErrGap}; \text{ and} \quad \text{Eq (1)}$$

$$\text{EnergyThh} = \text{AvgEnergy} + \text{EnergyGap}; \quad \text{Eq (2)}$$

where AvgSymErr is the average number of symbol errors for prior received blocks with CRC failures;

AvgEnergy is the average energy for prior received blocks with CRC failures;

SymErrGap is an offset or margin used for the number of symbol errors; and

EnergyGap is an offset or margin used for the block energy.

For the embodiment shown in equations (1) and (2), the threshold for each metric is defined based on statistics obtained for that metric and a margin selected for the metric. For this embodiment, the statistics for each metric is the average value obtained for the metric for prior received blocks with CRC failures. Since the statistics for each metric may change with operating conditions, defining the threshold based on the statistics allows the threshold to adapt to changing operating conditions. The SymErrGap and EnergyGap margins are selected to obtain the desired erasure detection performance and are dependent on various factors. For TrCh D for a voice call, good erasure detection performance can be obtained with SymErrGap set to 40 and EnergyGap set to 1 dB. Other values may be used for transport channels with different block sizes and formats. The margins may also be static or dynamically adjusted. For example, the margin for each metric may be set based on a variance computed for the metric for prior received blocks with CRC failures.

In FIG. 4, the AvgSymErr may be computed for all of the erased and DTX blocks and represented by a dashed line 432. The SymErrThh is represented by line 422 and is offset lower from line 432 by the SymErrGap. Similarly, the AvgEnergy may be computed for all of the erased and DTX blocks and represented by a dashed line 434. The EnergyThh is represented by line 424 and is offset higher or to the right of line 434 by the EnergyGap.

The average number of symbol errors, AvgSymErr, may be obtained by filtering the number of symbol errors for prior received blocks with CRC failures using an infinite impulse response (IIR) filter, a finite impulse response (FIR) filter, or some other type of filter. Similarly, the average block energy, AvgEnergy, may be obtained by filtering the energies of prior received blocks with CRC failures. In an embodiment, the AvgSymErr and AvgEnergy are obtained with a single tap IIR filter, which may be expressed as:

$$Y[n] = \alpha * X[n] + (1-\alpha) * Y[n-1];\qquad \text{Eq (3)}$$

where n is an index for received blocks;

α is a coefficient for the IIR filter;

X[n] is the IIR filter input, which is either NumSymErr or BlockEnergy; and

Y[n] is the IIR filter output, which is either AvgSymErr or AvgEnergy.

The coefficient may be set to α=0.25, for example, or to some other value. A larger value for the coefficient gives more weight to the NumSymErr and BlockEnergy for the current received block in the computation of AvgSymErr and AvgEnergy.

Each Update function in the above pseudo-code computes a new value for AvgSymErr or AvgEnergy, e.g., using the IIR filter shown in equation (3). Each Update function then computes a new value for SymErrThh or EnergyThh, e.g., as shown in equation (1) or (2).

The description for FIG. 4 and the pseudo-code described above use a horizontal line 422 and a vertical line 424 to determine whether a received block that did not pass CRC is either an erased block or a DTX block. Improved erasure detection performance may be achieved by using a line 450 having a slope that is not 0° or 90°. In this case, erasure detection may be performed by determining whether or not a given received block falls above or below this line.

Table 2 lists two possible types of error that can occur for erasure detection.

TABLE 2

| Error Type | Description |
|---|---|
| False Alarm | DTX → Erasure. A received block is declared as an erasure when in actuality it is a DTX. |
| Missed Detection | Erasure → DTX. A received block is declared as a DTX when in actuality it is an erasure. |

For power control, a false alarm causes an increase in the SIR target because a DTX block is erroneously declared as an erased block. The higher SIR target causes an increase in transmit power, which results in more power being used for the downlink transmission and reduces network capacity. A missed detection may cause the transmit power to be maintained at the same level when it should be increased instead, since an erased block is declared as a DTX block. The lower than needed transmit power increases the likelihood of receiving additional blocks in error, which can degrade performance. A false alarm may be considered to be more detrimental than a missed detection. This is because false alarms can cause the downlink transmit power to be set to an abnormally large value for a long time, and a sufficiently high false alarm rate can cause instability, as described below. A missed detection may be considered to be less detrimental than a false alarm, since it only affects a single user even though the effect may be severe. Missed detections cause the BLER on the DCCH to be higher for a short duration, but a high missed detection rate can cause important signaling information to be missed and may eventually lead to a dropped call. The erasure detection may be designed with the goals of maintaining the probability of false alarm ($P_{FA}$) at or below a low target value (e.g., less than 0.5%) while minimizing the probability of missed detection ($P_{MD}$). In the absence of erasure detection on the DCCH, both DTX blocks and erased blocks may be simply treated as DTX blocks, and power control is then effectively performed with 0% false alarm rate and 100% missed detection rate.

For the implementation shown by the pseudo-code described above, a tradeoff may be made between the probability of missed detection and the probability of false alarm by selecting suitable values for the two margins SymErrGap and EnergyGap. Smaller values for SymErrGap and EnergyGap increase the likelihood of the conditions using the SymErrGap and EnergyGap to be "true", which then increases the likelihood of a received block being declared as an erasure. The converse is true for larger values for SymErrGap and EnergyGap.

As shown in FIG. 4, cluster 410 for the erased blocks overlaps partially with cluster 420 for the DTX blocks. When there is an overlap, there will be detection error regardless of which values are used for the thresholds. A tradeoff can be made between the probability of false alarm and the probability of missed detection by adjusting the two thresholds. The probability of false alarm (DTX→Erasure) can be reduced by moving line 422 downward by increasing SymErrGap and/or moving line 424 to the right by increasing EnergyGap, albeit at a cost of a higher probability of missed detection (Erasure→DTX).

Figure 5:
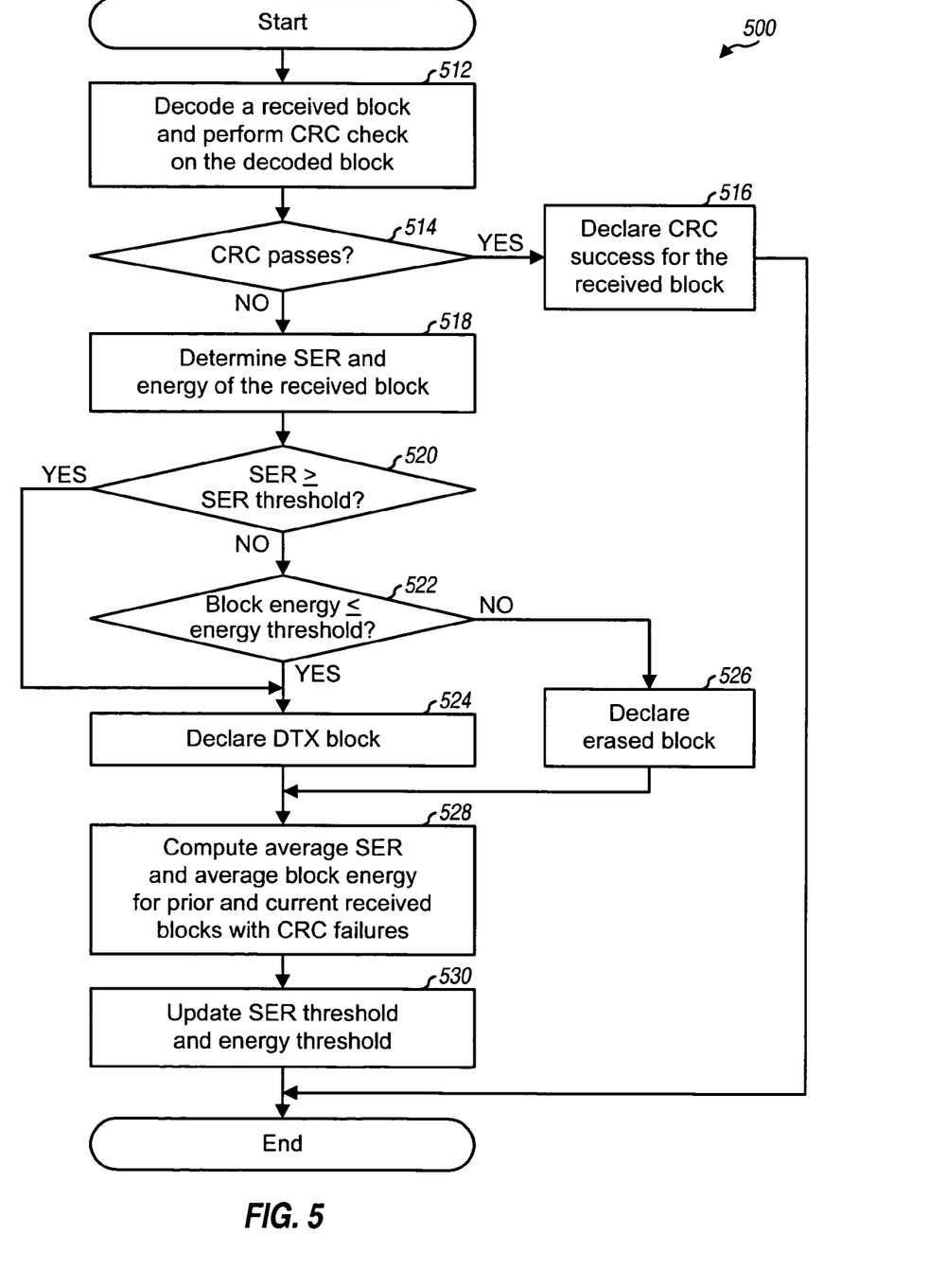
FIG. 5 shows a process for performing erasure detection.

FIG. 5 shows a process 500 to perform erasure detection for a received block for a transport channel with unknown format. Initially, the received block is decoded to obtain a decoded block, and a CRC check is performed on the decoded block (block 512). A determination is then made whether or not the CRC passes (block 514). If the CRC passes, then CRC success is declared for the received block (block 516), and the process then terminates. Otherwise, the SER and block energy for the received block are determined and used for erasure detection (block 518).

A determination is then made whether the SER for the received block is greater than or equal to the SER threshold (block 520). If the answer is 'yes', then the received block is declared as a DTX block (block 524). Otherwise, a determination is made whether the block energy is less than or equal to the energy threshold (block 522). If the answer is 'yes' for block 522, then the received block is declared as a DTX block (block 524). Otherwise, if the answer is 'no' for block 522, then the received block is declared as an erased block (block 526). After blocks 524 and 526, the average SER and average energy for the current and prior received blocks that did not pass the CRC are computed (block 528). The SER threshold and the energy threshold are then updated based on the average SER and the average energy, respectively, as described above (block 530). The process then terminates.

For the embodiment described above and shown in FIG. 5, the SER and block energy are used to determine whether a received block is an erased block or a DTX block. In general, any number of metrics and any type of metrics may be used for erasure determination. Examples of some other metrics include normalized energy, zero state bit, modified Yamamoto metric, ratio between rate matching on different transport channels, SIR target, received SIR, PO3, and so on.

The zero state bit indicates whether the Viterbi decoder encounters a known state for a received block. Each transport block is typically appended with K−1 tail bits (which are typically all zeros) prior to encoding with a convolutional encoder of constraint length K. The zero state bit is set if all zeros are obtained by the Viterbi decoder for the K−1 tail bits. If the CRC fails but the zero state bit is set, then the received block is more likely to be an erasure than a DTX.

The modified Yamamoto metric is based on path metrics for the convolutional decoding. The Viterbi decoder maintains the path metric for the best path at each of $2^{K-1}$ states in a trellis for the decoding. The path with the best path metric for all states is typically selected as the most likely sequence of data bits. The modified Yamamoto metric is indicative of the confidence in the decoded result, and is based on the difference between the selected (best) path through the trellis and the next closest path through the trellis. To derive the Yamamoto metric, the difference between the best and second best path metrics is compared against a threshold value to generate a binary value, which indicates whether or not the selected path meets a certain confidence criteria.

The rate matching attributes effectively determine the percentage of a CCTrCH assigned to the various transport channels that are multiplexed onto the CCTrCH. If rate matching is high for TrCh A and a large percentage of the CCTrCH is used for TrCh A, then the block energy and SER for the DCCH suffer. The ratio between rate matching for the different transport channels may be used to normalize the effect of varying rate matching attributes.

The normalized energy is obtained by dividing the block energy by the number of symbols in the block and is indicative of the average symbol energy. The normalization may also be with respect to the block energies of other transport channels. The PO3 is the offset between the DPCCH and the DPDCH. A higher PO3 may improve the SIR estimates and thus possibly reduce the variance of the cluster of DTX blocks and the cluster of erased blocks.

The flow diagram shown in FIG. 5 may be modified to incorporate the particular metrics selected for use. The threshold used for each metric may also be fixed (not changed) or adaptive (e.g., changed based on statistics obtained from the received blocks).

As an example, erasure detection may be performed based on various metrics, as follows:

$$\frac{BlockEnergy - EnergyThh}{SymErrGap} +$$

$$\frac{NumSymErr - SymErrThh}{EnergyGap} \geq$$

$$(1 - ZSBStateTrue) \times ZSB\_weight +$$

$$(1 - YamamotoStateTrue) \times Y\_weight +$$

$$SIR\,target \times SIR\,bias. \qquad \text{Eq (4)}$$

The expression on the left hand side of equation (4), if set equal to zero, defines a line passing through the (x, y) coordinate at (EnergyThh, SymErrThh) and having a slope of EnergyGap/SymErrGap (e.g., line 450 in FIG. 4). The expressions on the right hand side of equation (4) indicate the amount of shift toward the right applied to this line based on (1) whether the zero state bit (ZSB) is true or false, (2) whether the modified Yamamoto metric (Y) is true or false, and (3) the value of the SIR target set by the outer loop. If the zero state bit is true and the modified Yamamoto metric is true, then there is greater confidence that a received block is a transport block that is received in error (i.e., an erased block). The weights for the zero state bit and the modified Yamamoto metric are empirically derived best estimates (e.g., ZSB_weight=0.25 and Y_weight=0.1). The SIR bias may be set to zero (SIR_bias=0) to omit the effect of the SIR target from the equation (4). Equation (4) may be evaluated for each received block. A received block is deemed an erased block if the condition for equation (4) is true and deemed a DTX block otherwise.

The erasure detection technique described above may be used for various applications. Erasure detection for power control on the downlink is described below.

2. Power Control

Figure 6:
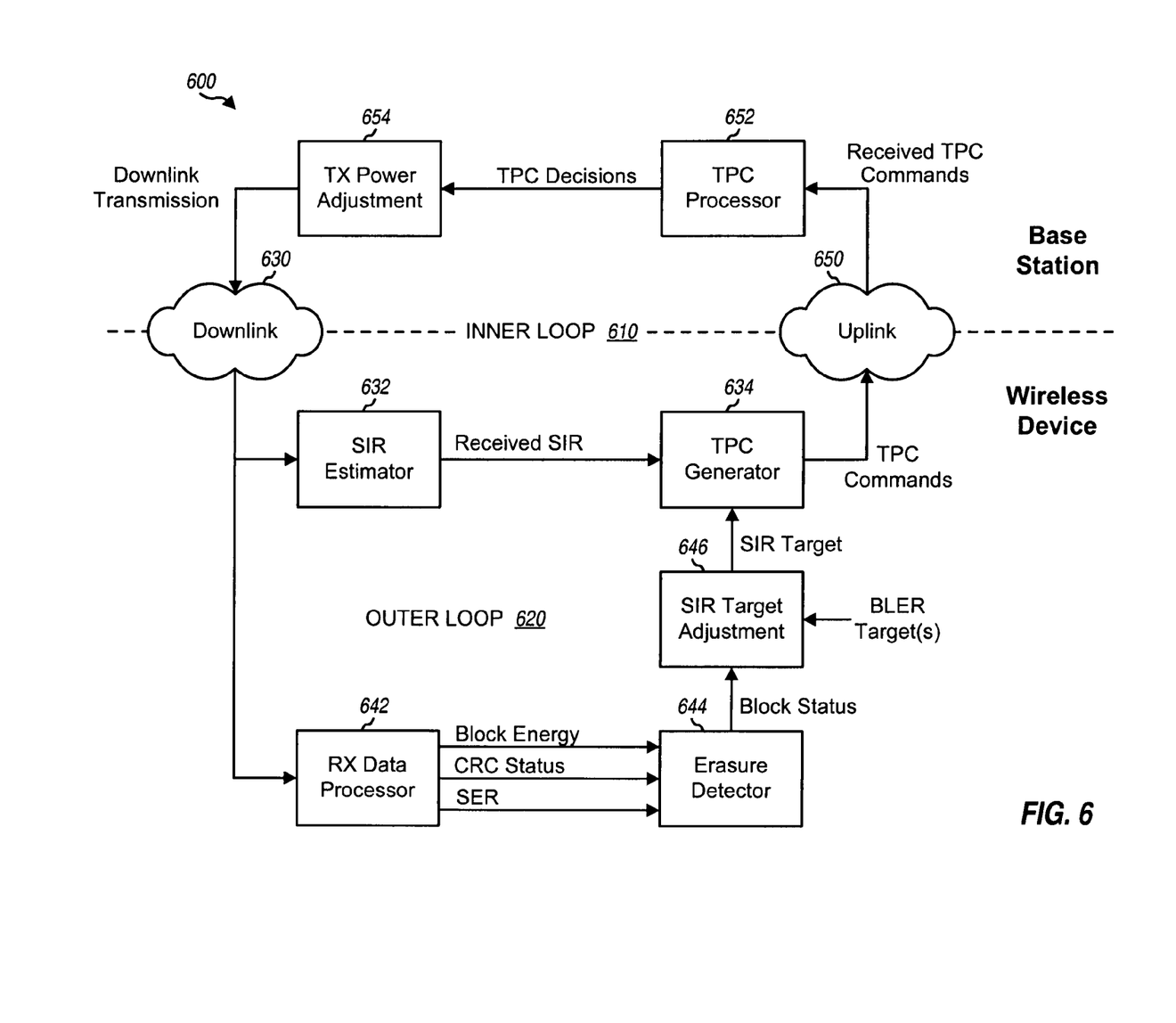
FIG. 6 shows a power control mechanism.

FIG. 6 shows a power control mechanism 600 that may be used to control the transmit power for a downlink transmission sent on a physical channel (e.g., the downlink DPCH) from a base station to a wireless device. Power control mechanism 600 includes an inner loop 610 and an outer loop 620.

Inner loop 610 maintains the received SIR for the downlink transmission, as measured at the wireless device, as close as possible to the SIR target for the physical channel. For inner loop 610, an SIR estimator 632 estimates the received SIR for the downlink transmission (e.g., based on the dedicated pilot in Pilot field 326 shown in FIG. 3) and provides the received SIR to a transmit power control (TPC) generator 634. TPC generator 634 also receives the SIR target from an SIR target adjustment unit 646, compares the received SIR against the SIR target, and generates a TPC command based on the comparison result. The TPC command is either an UP command to direct an increase in transmit power for the downlink transmission or a DOWN command to direct a decrease in transmit power. One TPC command is generated for each slot in W-CDMA and is sent on the uplink (cloud 650) to the base station.

The base station processes the uplink transmission from the wireless device and obtains a received TPC command for each slot. The received TPC command is a noisy version of the TPC command sent by the wireless device. A TPC processor 652 detects each received TPC command and provides a TPC decision, which indicates whether an UP command or a DOWN command was detected. A transmitter unit 654 then adjusts the transmit power for the downlink transmission accordingly based on the TPC decision. For W-CDMA, the TPC commands may be sent as often as 1500 times per second, thereby providing a relatively fast response time for inner loop 610.

Due to path loss and fading on the downlink (cloud 630), which typically vary over time and especially for a mobile wireless device, the received SIR at the wireless device continually fluctuates. Inner loop 610 attempts to maintain the received SIR at or near the SIR target in the presence of changes in the downlink.

Outer loop 620 continually adjusts the SIR target such that the BLER target(s) are achieved for the downlink transmission on the physical channel. The physical channel carries one or more transport channels, and each transport channel may be associated with a respective BLER target.

For each transport channel, a receive (RX) data processor 642 processes and decodes each block received on the transport channel, checks each decoded block, and provides a CRC status that indicates either CRC success or CRC failure for the received block. For each received block with CRC failure and an unknown format, an erasure detector 644 determines whether the block is an erased block or a DTX block. This determination may be made based on metrics such as, for example, the received block energy and the received block SER (provided by RX data processor 642). The received block energy may be provided by RX data processor 642 (as shown in FIG. 6) or SIR estimator 632, depending on the method used to compute the block energy. Erasure detector 644 may implement process 500 shown in FIG. 5 for erasure detection. For each received block, erasure detector 644 provides a block status that indicates whether the block is good (CRC success), erased, or DTX, as shown in Table 1.

In general, a physical channel to be power controlled may carry any number of transport channels and these transport channels may have various characteristics. The transport channels may be categorized into three types, as shown in Table 3.

TABLE 3

| Channel Type | Description | Block Status |
| --- | --- | --- |
| Type 1 | A transport channel with a CRC and is either (1) continuously active or (2) intermittently active but having known format. | Good or erased |
| Type 2 | A transport channel with a CRC and is intermittently active with unknown format. | Good, erased, or DTX |
| Type 3 | A transport channel without a CRC. | — |

A transport channel that uses transport formats with a CRC may be used for power control, whereas a transport channel that uses transport formats without a CRC is typically not used for power control. For example, TrChs A and D for a voice call have a CRC and may be used for power control, whereas TrChs B and C do not have a CRC and are not used for power control. A transport channel with CRC may be active all the time or intermittently active. A transport channel is continuously active if at least one transport block is sent on the transport channel in each TTI (e.g., regardless of whether or not there is voice activity). A transport channel that is intermittently active may have (1) a known format, with the transport format information being sent on the DPCCH, or (2) an unknown format, in which case BTFD and erasure detection may be performed for the transport channel. A type 1 transport channel (e.g., TrCh A) is either transmitted continuously or has a known format, so that each received block for this transport channel may be declared as either a good block or an erased block. A type 2 transport channel (TrCh D) is transmitted intermittently and the wireless device does not know the format, so each received block for this transport channel may be a good block, an erased block, or a DTX block.

Each type 1 and type 2 transport channel may be associated with a respective SIR target that is dependent on (1) the BLER target specified for that transport channel, (2) the transport format used for the transport channel for the current TTI, (3) the wireless channel condition, and (4) possibly other factors. For a given BLER target, different SIR targets may be needed for different channel conditions such as fast fading, slow fading, additive white Gaussian noise (AWGN) channel, and so on.

RX data processor 642 processes the downlink transmission, decodes the received blocks for each transport channel, checks each decoded block, and provides the CRC status (CRC success or failure) for each decoded block. For each type 2 transport channel, erasure detector 644 receives the CRC status and the metrics for each received block and provides a block status (good, erased, or DTX) for the received block. Adjustment unit 646 receives the block status and the BLER targets for the type 1 and type 2 transport channels carried by the physical channel and determines the SIR target for the physical channel. Adjustment unit 646 adjusts the SIR target based on the block status and the BLER targets such that the desired performance is obtained for the transport channels. The SIR target adjustment is typically performed for each TTI in which at least one received block is obtained for at least one transport channel (e.g., for each 20 msec TTI for a voice call). Adjustment unit 646 may derive the SIR target using various schemes.

In a first scheme, one SIR target is maintained for each type 1 and each type 2 transport channel, and the SIR target for each transport channel is adjusted based on the received blocks for that transport channel. For each type 1 transport channel, its SIR target is increased by the UP step if a received block is an erased block and decreased by the DOWN step if the received block is a good block. For each type 2 transport channel, its SIR target may be increased by the UP step for an erased block, decreased by the DOWN step for a good block, and maintained at the same level for a DTX block. The SIR target for the physical channel is set to the highest SIR target for all of the type 1 and type 2 transport channels.

In a second scheme, one SIR target is maintained for each type 1 transport channel, as described for the first scheme. However, SIR targets are not maintained for type 2 transport channels. If an erasure is detected on any transport channel, then this implies that the downlink transmit power is too low to properly demodulate the transport channel. The highest SIR target among the SIR targets maintained for the type 1 transport channels is then increased. The SIR targets are not affected by good blocks and DTX blocks detected on the type 2 transport channels.

In the third scheme, one SIR target is maintained for all type 1 and type 2 transport channels, and this SIR target is adjusted based on received blocks for these transport channels. The SIR target is increased by the UP step if an erased block is received on any type 1 or type 2 transport channel for the current TTI, maintained if only DTX blocks are detected for the current TTI, and decreased by the DOWN step if at least one good block and no erased blocks are detected for the current TTI. For this scheme, the SIR target is adjusted primarily by the received blocks for continuously active type 1 transport channels (e.g., TrCh A) and further updated based on received blocks for intermittently active type 2 transport channels (e.g., TrCh D). For a voice call, the SIR target is increased by the UP step if an erased block is received on either TrCh A or TrCh D and decreased by the DOWN step if at least one good block and no erased blocks are received on TrChs A and D. The SIR target is thus adjusted primarily by the continuously active TrCh A, and updated by the intermittently active TrCh D as necessary to achieve the desired performance for TrCh D. The third scheme may provide better performance than the first scheme since the SIR target for the physical channel can be adjusted downward by type 1 transport channels and does not depend on good blocks to be received on the intermittently active type 2 transport channel.

Other schemes may also be used to obtain the SIR target for the physical channel, and this is within the scope of the invention.

In general, if CRC success is declared for a received block, then the received SIR at the wireless device is likely to be higher than necessary, and adjustment unit 646 can reduce the SIR target by a small DOWN step. Conversely, if a received block is declared to be an erasure, then the received SIR at the wireless device is likely to be lower than necessary, and adjustment unit 646 can increase the SIR target by a large UP step. The DOWN and UP steps are dependent on the BLER target and the desired rate of convergence for the outer loop.

In an embodiment, for each erased block detected for a type 2 transport channel, the SIR target is increased by an $UP_{btfd}$ step size that is larger than the normal UP step size. For example, the $UP_{btfd}$ step size may be set to 1.0 dB while the normal UP step size may be set to 0.5 dB. Because transmission on a type 2 transport channel (e.g., TrCh D for the DCCH) may be infrequent but important, it is desirable to ramp up the SIR target quickly by the larger $UP_{btfd}$ step size in order to reliably decode any retransmission or new transmission on this transport channel.

In an embodiment, the SIR target is maintained at or below a maximum SIR target, $SIR_{max}$, if the SIR target is adjusted by a type 2 transport channel. The $SIR_{max}$ is set sufficiently high (e.g., at 5 dB) so that reliable reception of transport blocks sent on all transport channels (including TrCh D) can be achieved for most channel conditions. This upper limit ensures that the SIR target is not raised too high by false alarms on the type 2 transport channel due to the larger $UP_{btfd}$ step size. This upper limit may be removed if the probability of false alarm ($P_{FA}$) is sufficiently low and system stability can be assured.

The false alarm probability is sufficiently low if the following condition is satisfied:

$$P_{FA} << \frac{DOWN}{UP_{btfd}} \cdot \frac{TTI_2}{TTI_1}, \qquad \text{Eq (5)}$$

where $TTI_2$ is the TTI for a type 2 transport channel, which is 40 msec for TrCh D; and $TTI_1$ is the TTI for a type 1 transport channel, which is 20 msec for TrCh A.

If DOWN=0.05 dB and $UP_{btfd}$=1.0 dB, then the false alarm probability should be much less than 1%, or $P_{FA} << 0.01$, to ensure stability.

The constraint in equation (4) arises from the maximum rate at which the SIR target can come down when no transport blocks are received in error. If the SIR target is increased by the larger $UP_{btfd}$ step size due to DTX blocks erroneously detected as erased blocks for a type 2 transport channel (e.g., TrCh D), and thereafter decreased by the small DOWN steps due to good blocks received on a type 1 transport channel (e.g., TrCh A), then the SIR target will be adjusted to, and become stuck at, the maximum possible value if $P_{FA}>0.01$. This scenario can be avoided by ensuring that $P_{FA}<<0.01$.

Figure 7:
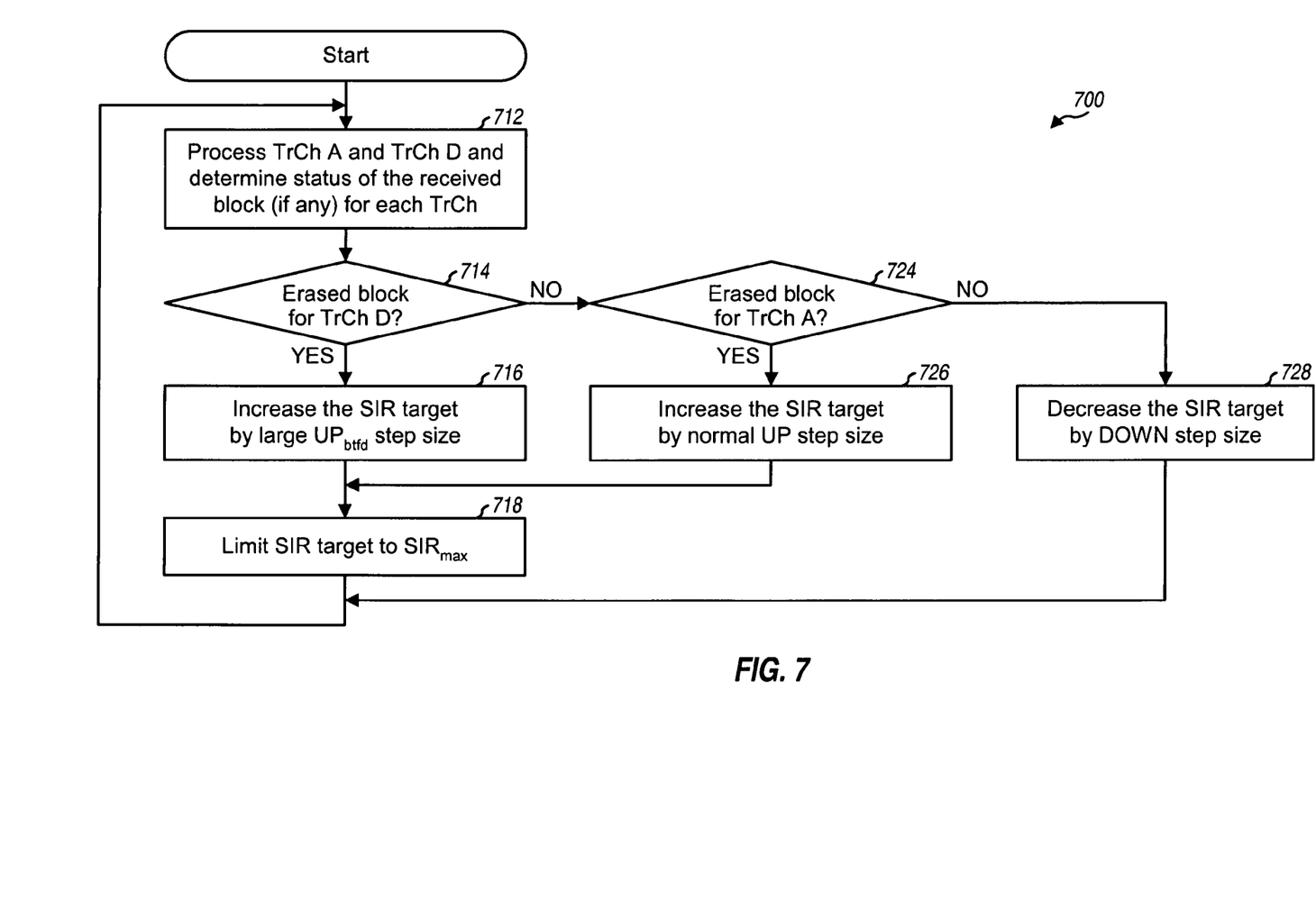
FIG. 7 shows a process for performing power control.

FIG. 7 shows a process 700 for performing power control for TrCh A and TrCh D for a voice call in W-CDMA using the second SIR target adjustment scheme described above. The TTI for TrCh A is 20 msec, and the TTI for TrCh D is 40 msec. Thus, one block is received on TrCh A in each 20 msec whereas one block is received on TrCh D in each 40 msec. For each time interval in which at least one block is received on these two transport channels (or each 20 msec), the received block for each transport channel (if any) is processed (e.g., decoded, checked, and erasure detected) to determine the status of the block (block 712). The processing for TrCh D for block 712 may be performed as shown in FIG. 5. A determination is then made whether an erased block is obtained for TrCh D (block 714). If the answer is 'yes', then the SIR target is increased by the larger $UP_{btfd}$ step size (block 716). The SIR target may then be limited to $SIR_{max}$ (block 718). If the answer is 'no' for block 714, then a determination is made whether an erased block is obtained for TrCh A (block 724). If the answer is 'yes', then the SIR target is increased by the normal UP step size (block 726), and the SIR target may be limited to S1 (block 718). If the answer is 'no' for block 724, which indicates that a good block was obtained for TrCh A and/or TrCh D and an erased block was not obtained for TrCh A, then the SIR target is decreased by the DOWN step size (block 728). From blocks 718 and 728, the process returns to block 712 to perform power control for the next time interval.

3. System

Figure 8:
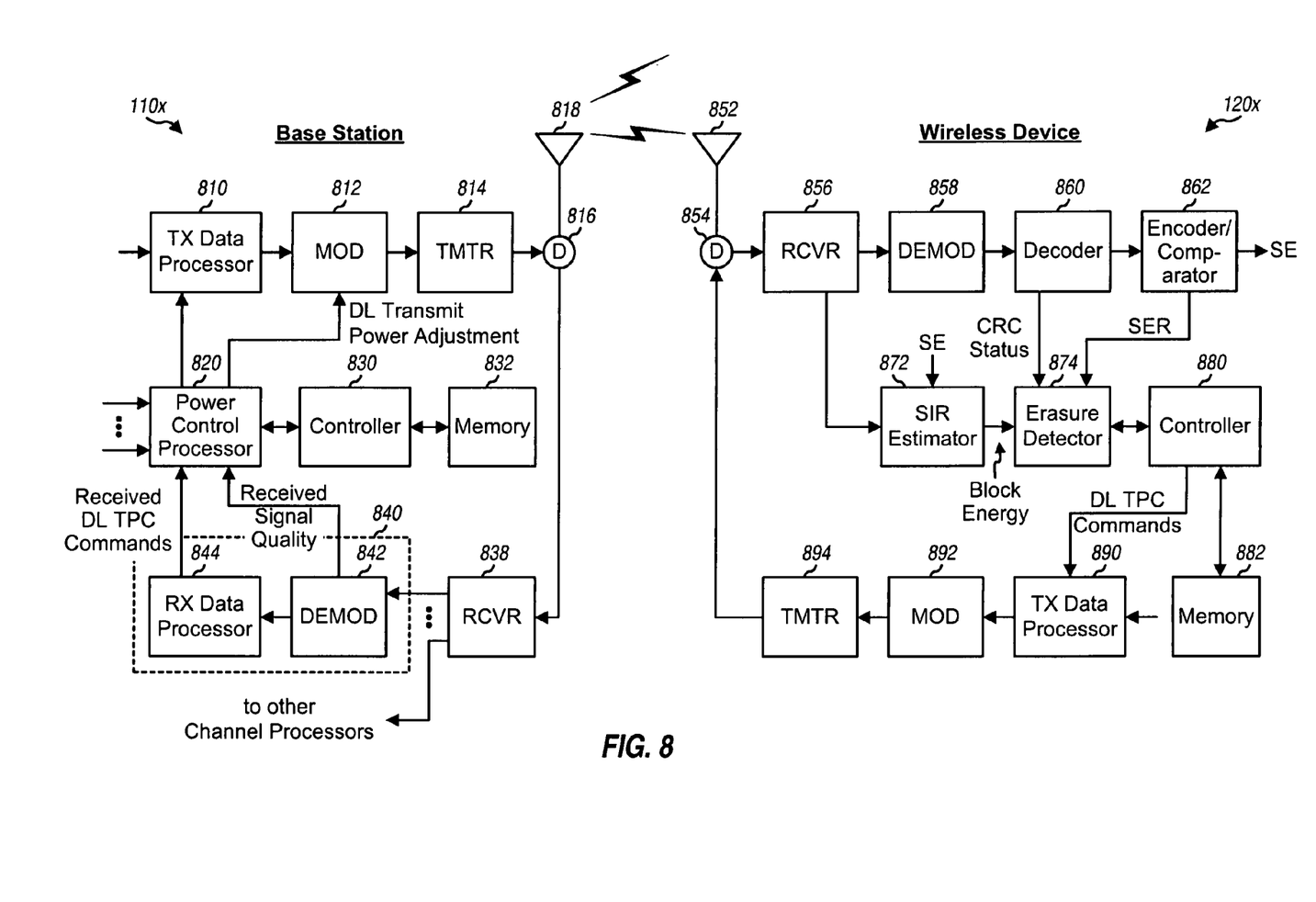
FIG. 8 shows a block diagram of a base station and a wireless device.

FIG. 8 shows a block diagram of an embodiment of a base station 110x and a wireless device 120x. On the downlink, a transmit (TX) data processor 810 receives data of various types, processes (e.g., formats, encodes, interleaves, and modulates) the received data, and provides modulated data. TX data processor 810 processes the data for each TTI of each transport channel based on the transport format selected for that TTI and transport channel. A modulator (MOD) 812 further processes (e.g., channelizes, spectrally spreads or scrambles, and so on) the modulated data and provides data chips. A transmitter unit (TMTR) 814 conditions (e.g., converts to analog, amplifies, filters, and frequency upconverts) the data chips to generate a downlink signal. The downlink signal is routed through a duplexer (D) 816 and transmitted via an antenna 818 to the wireless devices.

At wireless device 120x, the downlink signal is received by an antenna 852, routed through a duplexer 854, and provided to a receiver unit (RCVR) 856. Receiver unit 856 conditions (e.g., filters, amplifies, and frequency downconverts) the received signal and further digitizes the conditioned signal to obtain data samples. A demodulator (DEMOD) 858 processes (e.g., spectrally despreads, channelizes, and data demodulates) the data samples to obtain received symbols (or symbol estimates). Demodulator 858 may implement a rake receiver that can process multiple signal instances in the received signal. A decoder 860 then deinterleaves and decodes the received symbols for each received block to obtain a decoded block, checks each decoded block to determine the CRC status of the block, and provides the CRC status to an erasure detector 874. An encoder/comparator 862 re-encodes the decoded bits for each received block with CRC failure to obtain re-encoded symbols for the block, and compares the re-encoded symbols against hard decisions of the received symbols to determine symbol errors (SE) and the SER for the block. The SER is provided to an erasure detector 874, and indications of symbol errors may be provided to an SIR estimator 872 and used to determine the block energy.

SIR estimator 872 estimates the received SIR for each physical channel used for data transmission and may also determine the energy of each received block with CRC failure for a type 2 transport channel. The block energy may be computed in a manner that takes into account symbol errors in the received block, as described above, and is provided to erasure detector 874. Erasure detector 874 performs erasure detection for each received block from a type 2 transport channel that fails CRC and determines whether the received block is an erased block or a DTX based on the SER, the block energy, and so on, as described above. Erasure detector 874 may implement the process shown in FIG. 5. Erasure detector 874 provides the block status (good, erased, or DTX) for each received block to a controller 880. Controller 880 performs power control, adjusts the SIR target based on the status of each received block, and generates downlink TPC commands used to adjust the transmit power of the downlink physical channel (e.g., the downlink DPCH).

On the uplink, a TX data processor 890 receives and processes (e.g., formats, encodes, interleaves, and modulates) various types of data. A modulator 892 further processes (e.g., channelizes and spectrally spreads) the data from TX data processor 890 and provides data chips. The downlink TPC commands may be multiplexed with control data and transmitted on the uplink DPCCH. The data chips are conditioned by a transmitter unit 894 to generate an uplink signal, which is then routed through duplexer 854 and transmitted via antenna 852 to one or more base stations.

At base station 110x, the uplink signal is received by antenna 818, routed through duplexer 816, and provided to a receiver unit 838. Receiver unit 838 conditions the received signal, digitizes the conditioned signal, and provides a sample stream to each channel processor 840. Each channel processor 840 includes a demodulator 842 and an RX data processor 844 that receives and processes the sample stream for one wireless device to recover the transmitted data and downlink TPC commands. A power control processor 820 receives the downlink TPC commands and generates a downlink transmit power adjustment control that adjusts the transmit power of the downlink physical channel for wireless device 120x.

Controllers 830 and 880 direct the operation of various units within the base station and the wireless device, respectively. Controller 830 and 880 may also perform various functions for erasure detection and power control for the uplink and downlink, respectively. Each controller may also implement the SIR estimator and erasure detector for its link. Memory units 832 and 882 store data and program codes for controllers 830 and 880, respectively.

The erasure detection and power control techniques described herein can improve the performance of a type 2 transport channel. The outer loop traditionally operates only on type 1 transport channels (e.g., continuously active transport channels with CRC). Since a type 2 transport channel (e.g., TrCh D for the DCCH) does not satisfy these criteria, the type 2 transport channel is typically not considered for power control and its performance is then dependent on the SIR target set by the type 1 transport channel(s) that are being power controlled. In some instances, the SIR target set by the type 1 transport channel(s) is too low for reliable transmission on the type 2 transport channel. This may cause the wireless device to miss important signaling messages and/or data and may further cause other deleterious effects.

The problem is exacerbated, for example, if the wireless device attempts to add a data call during a long period of no activity for a voice call. For AMR, no activity requires a lower SIR than voice activity, and the SIR target is driven to a low value during this long period of no activity. The low SIR target causes a high BLER for the signaling sent on TrCh D to set up the data call. The higher BLER results in a high failure rate for the call setup.

With the techniques described herein, the received blocks for the type 2 transport channel can be reliably detected and used for power control so that good performance can be achieved for both types 1 and 2 transport channels.

For clarity, the erasure detection and power control techniques have been specifically described for a voice call on the downlink in W-CDMA. Thus, W-CDMA terminology such as transport channels, physical channel, SIR target, and BLER target are used for the above description. In general, these techniques may be used for the downlink as well as the uplink. Furthermore, these techniques may be used for any wireless communication system that implements power control and for any transmission in which the receiver does not known the format beforehand. Other systems may use different terminology for channels (e.g., traffic channels), SIR target (e.g., target SNR), BLER target (e.g., frame error rate (FER)), and so on.

The erasure detection and power control techniques described herein may be implemented by various means. For example, these techniques may be implemented in hardware, software, or a combination thereof. For a hardware implementation, the processing units used to perform erasure detection and power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the erasure detection and power control techniques may be implemented with modules (e.g., procedures, functions, and so on) that perform the functions described herein. The software codes may be stored in a memory unit (e.g., memory unit 832 or 882 in FIG. 8) and executed by a processor (e.g., controller 830 or 880). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing erasure detection in a wireless communication system, comprising:
    ascertaining whether a received block passes an error detection code; and
    if the received block does not pass the error detection code, determining whether the received block is an erased block or a discontinuous transmission (DTX) block based on at least one metric determined for the received block, wherein each of the at least one metric is compared against a threshold used for the metric, wherein the received block is deemed to be an erased block if the at least one metric indicates that a data block was transmitted by a transmitter and decoded in error by a receiver and is deemed to be a DTX block if the at least one metric indicates that no data block was transmitted by the transmitter, and wherein the threshold for each metric is based on a variance computed for the metric for prior received blocks that did not pass the error detection code.

2. The method of claim 1, further comprising:
    adjusting the threshold used for each metric based on statistics obtained for prior received blocks that did not pass the error detection code.

3. The method of claim 1, wherein the error detection code is a cyclic redundancy check (CRC) code.

4. The method of claim 1, wherein one of the at least one metric is for a symbol error rate (SER) for the received block.

5. The method of claim 4, wherein the determining whether the received block is an erased block or a DTX block comprises determining the SER for the received block, comparing the SER for the received block against an SER threshold, and declaring the received block to be an erased block if the SER for the received block is less than the SER threshold.

6. The method of claim 5, further comprising:
determining an average SER for prior received blocks that did not pass the error detection code, and updating the SER threshold based on the average SER.

7. The method. of claim 1, wherein one of the at least one metric is for energy of the received block.

8. The method of claim 7, wherein the determining whether the received block is an erased block or a DTX block comprises determining the energy of the received block, comparing the energy of the received block against an energy threshold, and declaring the received block to be an erased block if the energy of the received block is greater than the energy threshold.

9. The method of claim 8, further comprising:
determining an average energy for prior received blocks that did not pass the error detection code, and updating the energy threshold based on the average energy.

10. The method of claim 1, wherein one of the at least one metric is for a modified Yamamoto metric indicative of confidence in a decoding result for the received block.

11. The method of claim 1, wherein one of the at least one metric is for a zero state bit indicative of whether or not a Viterbi decoder encounters a known state for the received block.

12. The method of claim 1, wherein one of the at least one metric is for a signal-to-noise-plus-interference ratio (SIR) target maintained for a physical channel via which the received block is obtained.

13. A method of performing erasure detection in a wireless communication system, comprising:
ascertaining whether a received block passes a cyclic redundancy check (CRC);
if the received block does not pass the CRC, determining energy of the received block, determining a symbol error rate (SER) for the received block and comparing the energy of the received block against an energy threshold, wherein the energy threshold is based on a variance computed for the energy of the received block for prior received blocks that did not pass the error detection code; and
comparing the SER for the received block against an SER threshold, and declaring the received block to be an erased block if the SER for the received block is less than the SER threshold and the energy of the received block is greater than the energy threshold, the erased block indicating a data block was transmitted by a transmitter and decoded in error by a receiver.

14. The method of claim 13, further comprising:
if the received block does not pass the CRC, determining an average energy for prior received blocks that did not pass the CRC, determining an average SER for the prior received blocks that did not pass the error detection code, updating the energy threshold based on the average energy, and updating the SER threshold based on the average SER.

15. An apparatus in a wireless communication system, comprising:
a data processor operative to ascertain whether a received block passes an error detection code; and
an erasure detector operative to, if the received block does not pass the error detection code, determine whether the received block is an erased block or a discontinuous transmission (DTX) block based on at least one metric determined for the received block, wherein each of the at least one metric is compared against a threshold used for the metric, wherein the received block is deemed to be an erased block if the at least one metric indicates that a data block was transmitted by a transmitter and decoded in error by the data processor and is deemed to be a DTX block if the at least one metric indicates that no data block was transmitted by the transmitter, and wherein the threshold for each metric is based on a variance computed for the metric for prior received blocks that did not pass the error detection code.

16. The apparatus of claim 15, wherein the erasure detector is operative to obtain the at least one metric for the received block, compare each of the at least one metric against a threshold used for the metric, and declare the received block to be an erased block or a DTX block based on comparison result for the at least one metric.

17. The apparatus of claim 16, wherein the erasure detector is further operative to adjust the threshold used for each metric based on statistics obtained for prior received blocks that did not pass the error detection code.

18. The apparatus of claim 15, wherein the erasure detector is operative to obtain energy of the received block and a symbol error rate (SER) for the received block, compare the energy of the received block against an energy threshold, compare the SER for the received block against an SER threshold, and declare the received block to be an erased block if the SER for the received block is less than the SER threshold and the energy of the received block is greater than the energy threshold.

19. The method of claim 18, wherein the erasure detector is further operative to determine an average energy for prior received blocks that did not pass the CRC, determine an average SER for the prior received blocks that did not pass the error detection code, update the energy threshold based on the average energy, and update the SER threshold based on the average SER.

20. The apparatus of claim 15, wherein the received block is for a transport channel used to carry signaling data for Wideband Code Division Multiple Access (W-CDMA).

21. An apparatus in a wireless communication system, comprising:
means for ascertaining whether a received block passes an error detection code; and
means for, if the received block does not pass the error detection code, determining whether the received block is an erased block or a discontinuous transmission (DTX) block based on at least one metric determined for the received block, wherein each of the at least one metric is compared against a threshold used for the metric, wherein the received block is deemed to be an erased block if the at least one metric indicates that a data block was transmitted by a transmitter and decoded in error by a receiver and is deemed to be a DTX block if the at least one metric indicates that no data block was transmitted by the transmitter, and wherein the threshold for each metric is based on a variance computed for the metric for prior received blocks that did not pass the error detection code.

22. The apparatus of claim 21, wherein the means for determining whether the received block is an erased block or a DTX block comprises means for determining the at least one metric for the received block, means for comparing each of the at least one metric against a threshold used for the metric, and means for declaring the received block to be an erased block or a DTX block based on comparison result for the at least one metric.

23. The apparatus of claim 22, further comprising:
means for adjusting the threshold used for each metric based on statistics obtained for prior received blocks that did not pass the error detection code.

24. A method of performing power control for a data transmission in a wireless communication system, comprising:
determining whether a received block is a good block, an erased block, or a discontinuous transmission (DTX) block based on an error detection code and at least one metric, wherein each of the at least one metric is compared against a threshold used for the metric, wherein the received block is deemed to be a good block if the error detection code indicates that a data block was transmitted by a transmitter and decoded correctly by a receiver, an erased block if the at least one metric indicates that a data block was transmitted by the transmitter but decoded in error by the receiver, and a DTX block if the at least one metric indicates that no data block was transmitted by the transmitter, and wherein the threshold for each metric is based on a variance computed for the metric for prior received blocks that did not pass the error detection code; and
increasing a signal-to-noise-plus-interference ratio (SIR) target if the received block is deemed to be an erased block, wherein transmit power used for the data transmission is determined by the SIR target.

25. The method of claim 24, further comprising:
decreasing the SIR target if the received block is deemed to be a good block; and
maintaining the SIR target at same level if the received block is deemed to be a DTX block.

26. The method of claim 24, wherein the error detection code is a cyclic redundancy check (CRC), and wherein the determining comprises:
declaring the received block as a good block if the received block passes the CRC, and if the received block does not pass the CRC, determining at least one metric for the received block, comparing each of the at least one metric against a threshold used for the metric, and declaring the received block to be an erased block or a DTX block based on comparison result for the at least one metric.

27. A computer-readable medium storage comprising code, which, when executed by a processor instruct the processor to perform operations for erasure detection in a wireless communication system, the computer-readable memory unit comprising:
code for ascertaining whether a received block passes an error detection code; and
code for, if the received block does not pass the error detection code, determining whether the received block is an erased block or a discontinuous transmission (DTX) block based on at least one metric determined for the received block, wherein each of the at least one metric is compared against a threshold used for the metric, wherein the received block is deemed to be an erased block if the at least one metric indicates that a data block was transmitted by a transmitter and decoded in error by a receiver and is deemed to be a DTX block if the at least one metric indicates that no data block was transmitted by the transmitter, wherein the threshold for each metric is based on a variance computed for the metric for prior received blocks, that did not pass the error detection code.

28. The computer-readable storage medium of claim 27, wherein the computer-readable storage medium is a memory unit.

29. The computer-readable storage medium of claim 27, wherein the code for determining whether the received, block is an erased block or a DTX block comprises code for determining the at least one metric for the received block, code for comparing each of the at least one metric against a threshold used for the metric, and code for declaring the received block to be an erased block or a DTX block based on comparison result for the at least one metric.

30. The computer-readable storage medium of claim 29, further comprising:
code for adjusting the threshold used for each metric based on statistics obtained for prior received blocks that did not pass the error detection code.

* * * * *